(No Model.) 2 Sheets—Sheet 1.
M. N. FREDERICK.
BICYCLE LOCK.
No. 565,161. Patented Aug. 4, 1896.
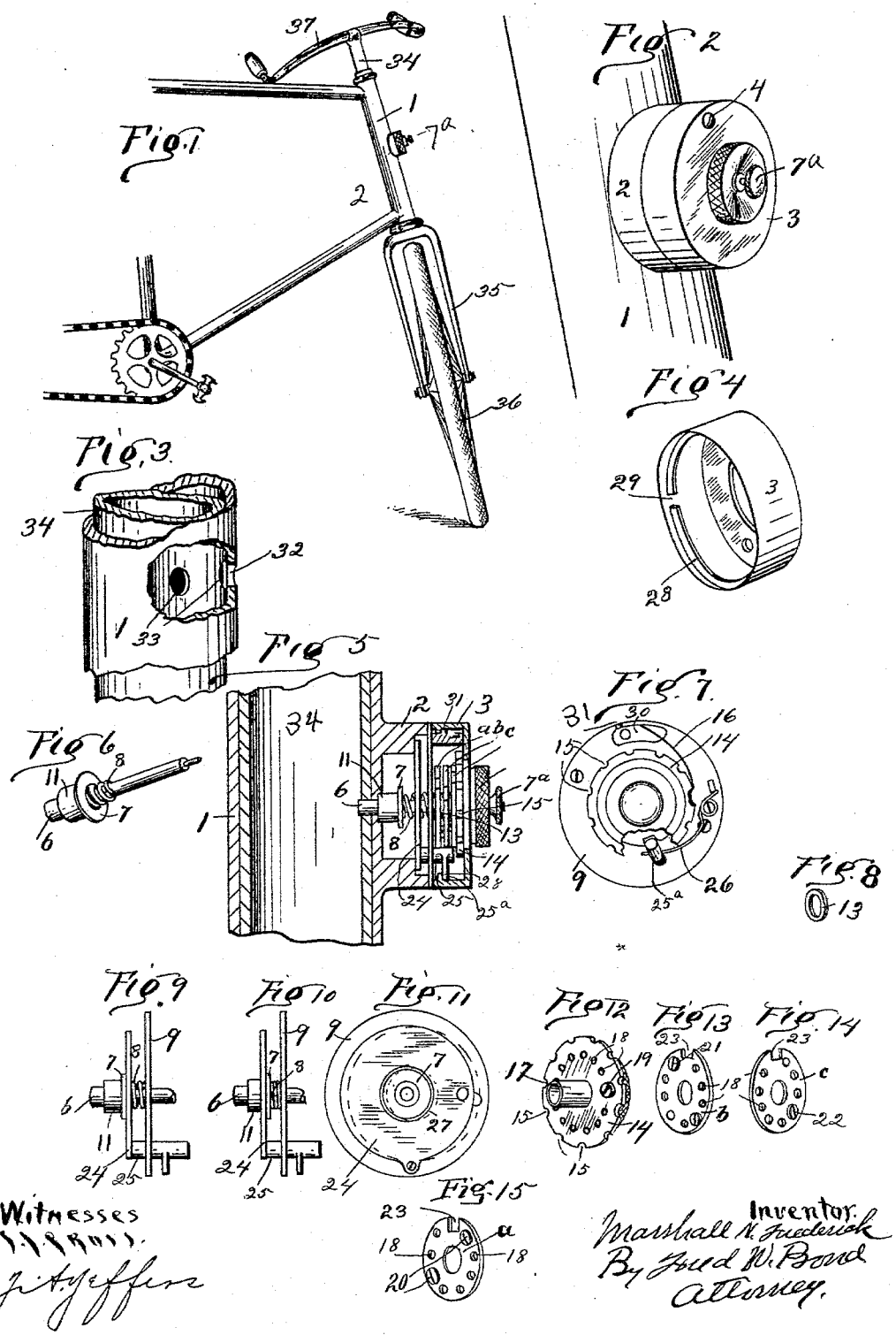

(No Model.) 2 Sheets—Sheet 2.

M. N. FREDERICK.
BICYCLE LOCK.

No. 565,161. Patented Aug. 4, 1896.

Witnesses. Inventor
Marshall N. Frederick
By Fred W. Bond
Attorney.

UNITED STATES PATENT OFFICE.

MARSHALL N. FREDERICK, OF CANTON, OHIO.

BICYCLE-LOCK.

SPECIFICATION forming part of Letters Patent No. 565,161, dated August 4, 1896.

Application filed November 25, 1895. Serial No. 569,970. (No model.)

*To all whom it may concern:*

Be it known that I, MARSHALL N. FREDERICK, a citizen of the United States, residing at Canton, in the county of Stark and State of Ohio, have invented certain new and useful Improvements in Bicycle-Locks; and I do hereby declare that the following is a full, clear, and exact description of the same, reference being had to the annexed drawings, making a part of this specification, and to the letters and figures marked thereon, in which—

Figure 16:
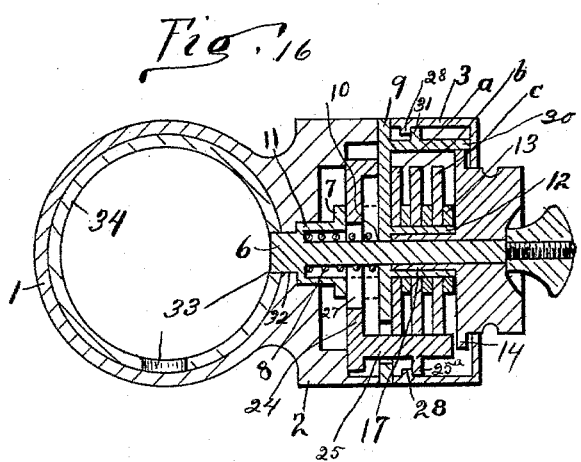
Figure 17:
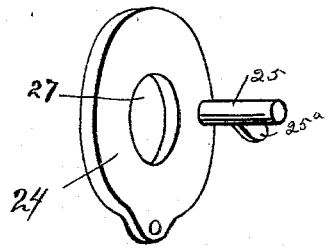

Figure 1 is a view showing the lock properly attached to the steering-head. Fig. 2 is an enlarged view of the steering-head, showing the lock properly attached thereto. Fig. 3 is a view showing portions of the steering-post and illustrating the locking-apertures. Fig. 4 is a detached view of the lock-cover. Fig. 5 is a vertical section of the lock case and cover, showing the different parts of the lock properly assembled. Fig. 6 is a detached view of the locking-spindle and its different parts. Fig. 7 is a top view showing the cover removed and a portion of the counting-disk broken away. Fig. 8 is a detached view of one of the spacing-collars. Fig. 9 is a view showing a portion of the locking-spindle and illustrating the locking-plate placed in position to lock the spindle at its extreme inward movement to lock the fork. Fig. 10 is a similar view showing the locking-plate in position to hold the spindle out of locking position. Fig. 11 is a detached view of the base-plate, showing a bottom or under side view of the locking-plate, also showing the position of the locking-spindle and its collar with reference to the locking-plate. Fig. 12 is a detached view of the counting-disk and its hollow post or shaft. Figs. 13, 14, and 15 are detached views of the tumblers. Fig. 16 is a transverse section of the lock and steering-post, showing the same placed in proper position with reference to each other. Fig. 17 is a detached view of the locking-plate and its post and cover-locking tongue.

The present invention has relation to bicycle-locks; and it consists in the different parts and combination of parts hereinafter described, and particularly pointed out in the claims.

The object of the present invention is to lock the front or forward wheel at an angle to the rear wheel, or, in other words, to lock the two wheels of the bicycle one at an angle to the other, thereby providing a means for bringing the bicycle out of operative position.

Similar letters and figures of reference indicate corresponding parts in all the figures of the drawings.

In the accompanying drawings, 1 represents the steering-head, which is constructed in the ordinary manner and has no particular reference to the present invention, except that when the invention is applied to the bicycle it is located upon the steering-post, as illustrated in Figs. 1 and 2. The steering-post 1 is provided with the casing or housing 2, which is preferably formed integral with the steering-post, but it may be made separately and attached in any convenient and well-known manner. To the housing or casing 2 is attached the cover 3 by means of the screw 4 and the flange 5, said flange being for the purpose hereinafter described.

The locking-spindle 6 is substantially of the form shown in Fig. 6, and its outer end is provided with the operating-knob 7$^a$, which knob is attached in any convenient and well-known manner to the locking-spindle 6. The locking-spindle 6 is provided with the disk or collar 7, which disk or collar is securely attached to the locking-spindle 6, or, if desired, said disk may be formed integral with the spindle. Upon the locking-spindle 6 is located the coiled spring 8, which coiled spring is for the purpose hereinafter described.

To the housing or casing 2 is attached by suitable screws or otherwise the base-plate 9, which base-plate is provided with the aperture 10, said aperture being for the purpose of receiving the locking-spindle 6, and at the same time forms a guide for the longitudinal movement of said locking-spindle. For the purpose of automatically forcing the locking-spindle 6 inward or toward the steering-post the spring 8 is provided, which spring is held in proper position by means of the base-plate 9 and the socket 11. The base-plate is provided with the thimble or hollow shaft 12, (best seen in Fig. 16,) which thimble forms a bearing or post for the tumblers *a*, *b*, and *c*, said tumblers being properly spaced by means of the spacing-collars 13. Upon the locking-spindle 6 is located the counting-disk 14, which counting-disk is provided with the notches 15, said notches being located upon the periphery of the counting-disk 14, said counting-disk being held at the desired point against rotation by means of spring 16, which spring is so arranged that it will click at the time the portion of the spring enters or is received into one of the notches 15. The notches 15 and the spring 16 are so formed that said spring will only temporarily hold the counting-disk against rotation. The counting-disk 14 is provided with the hollow shaft 17, which shaft is located in the thimble 12, as illustrated in Fig. 16. The counting-disk 14 and the tumblers *a*, *b*, and *c* are each provided with the apertures 18, which apertures are preferably screw-threaded, said apertures being for the purpose of receiving and holding the screws 19, 20, 21, and 22, said screws being located in different apertures for the purpose of changing the combination.

For the purpose of describing the portion of the lock with reference to its tumblers and bringing said tumblers into a position so that the master-notches 23 will register, I will say that the lock is set to the combination of "1," "2," and "3." The counting-disk 14 is turned one notch to the right, then two notches to the left, then three to the right, which completes the above-mentioned combination. This movement of the counting-disk brings all of the master-notches 23 into alinement. At the moment the master-notches 23 are brought into alinement the locking-plate 24 is forced to the center by means of the post 25 and the spring 26, thereby causing the aperture 27 to come directly in line with the disk 7 and allow said disk to pass through the aperture 27 as the locking-spindle is moved longitudinally in either direction. For the purpose of securing the cover or cap 3 upon the housing 2, independent of the screw 4, the cap or cover is provided with the flange 28, which flange is located upon the inner periphery of said cover and extends nearly around the inner periphery of said cover, the ends of said flange being located a short distance apart, thereby forming the gap or space 29. To the block 30, or its equivalent, is attached the pin 31, said block being securely attached to the base-plate 9. The pin 31 is so located that it will come on top of the flange 28 when the cap or cover 3 is properly adjusted, said pin being shown in proper position in Fig. 16.

The steering-head 1 is provided with the aperture 32, which aperture receives the inner end of the locking-spindle 6. When the lock is open, the disk 7 is located upon the top or upper side of the locking-plate 24, as illustrated in Fig. 10, thereby holding the locking-spindle out of contact with the apertures 33, said apertures 33 being located so as to register with the aperture 32 and permit the locking-spindle 6 to enter one of the apertures 33 and thereby lock the post 34 against rotation. It will be understood that the apertures 33 are to be so located that the fork 35 and its wheel 36 can be locked at any desired angle. It will be understood that the handle-bar 37 is to be attached to the top or upper end of the post 34 in the ordinary manner. It will be understood that by the use of the spring 8 the locking-spindle 6 will be automatically forced into the proper aperture 33 when the locking-plate 24 is brought into position, so that the disk 7 will pass through the aperture 27, formed in said locking-plate 24.

For the purpose of setting the lock so that the spindle 6 will not be allowed to enter any of the apertures 33, the disk 7 is placed upon the upper side of the locking-plate 24, and when it is desired to lock the bicycle the disk 7 is located upon the under side of the locking-plate, as illustrated in Fig. 9.

It will be understood that as the post 34 is rotated by means of the handle-bar the aperture 33 will pass the apertures 32, and when one of the apertures 33 comes into proper alinement with the apertures 32 the locking-spindle 6 will enter the aperture registering with the aperture 32, thereby locking the front or forward wheel at an angle to the rear wheel, which puts the bicycle in such a condition that it cannot be used.

The post 25, located upon and attached to the locking-plate 24, is provided with the tongue 25$^a$, which tongue will engage the flange 28, as illustrated in Figs. 5 and 16, when the locking plate and post is forced to one side by means of the rotation of the tumblers, thereby locking the cap 3 upon the housing 2, independent of the screw 4.

I have described the lock as especially applied to a bicycle, but it will be understood that the lock proper can be used independent of a bicycle without departing from the nature of my invention.

In order to bring the locking-plate 24 into position to lock the spindle against longitudinal movement, the counting-disk 14 is rotated, which in turn rotates one or all of the tumblers *a*, *b*, and *c*, as the case may be, which rotation lifts the post 25 out of the notch or notches into which it has been forced by means of the spring 26, thereby throwing or forcing the locking-plate 24 out of center and thereby locking the spindle and its disk at the point it may be located at the time the swinging disk or locking-plate is turned out of center.

The tumblers *a*, *b*, and *c* are rotated with the counting-disk by means of the screws 19, 20, 21, and 22. The screw located upon the counting-disk will come in contact with the screw located upon the tumbler adjacent to the counting-disk, thereby causing the tumbler to rotate with the counting-disk. After the counting-disk has been rotated until all of the screws have come in contact with each other, all of the tumblers will be rotated in unison with the counting-disk.

It will be understood that when the counting-disk is rotated in the opposite direction from the direction to bring the tumblers into rotation, said tumblers will remain stationary until they are brought into proper engagement with the screws or pins.

Having fully described my invention, what I claim as new, and desire to secure by Letters Patent, is—

1. The combination of a lock-case provided with a detachable cover, a swinging lock-plate pivotally attached to the base-plate 9, or its equivalent, a series of tumblers provided with apertures and screws or pins located in a given number of apertures, and the locking-spindle 6, provided with the disk 7, and spring 8, substantially as and for the purpose specified.

2. The combination of a case, a cover and counting-disk provided with a hollow spindle, a reciprocating locking-spindle provided with a disk, a swinging locking-plate provided with a post, said post being provided with a lip or tongue and a series of tumblers provided with detachable pins or screws, and the master-notches located upon the peripheries of the tumblers, substantially as and for the purpose specified.

3. In a lock of the class described, a case or cover having located therein, a series of tumblers, a counting-disk having notches upon its periphery, a spring to engage the notches, a reciprocating locking-spindle provided with a disk, and a swinging or vibrating locking-plate, substantially as and for the purpose specified.

4. The combination of a case, a cover and a counting-disk provided with a hollow spindle, a reciprocating locking-spindle provided with a disk, the swinging locking-plate provided with a post, said post provided with a lip or tongue and a spring bearing against said post, and a series of tumblers provided with detachable pins or screws and the master-notches located upon the peripheries of the tumblers, substantially as and for the purpose specified.

In testimony that I claim the above I have hereunto subscribed my name in the presence of two witnesses.

MARSHALL N. FREDERICK.

Witnesses:
F. W. BOND,
BERTHA FINCH.